G. ENRICO.
RADIATOR SUSPENSION FOR MOTOR CARS.
APPLICATION FILED DEC. 10, 1906.
939,961.
Patented Nov. 9, 1909.
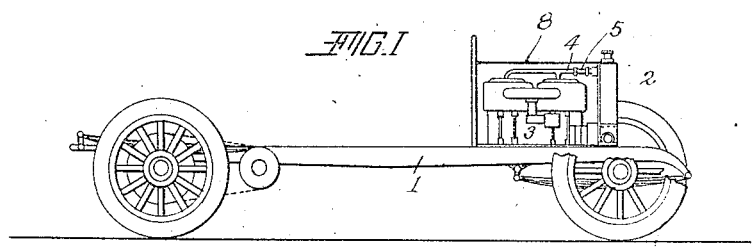
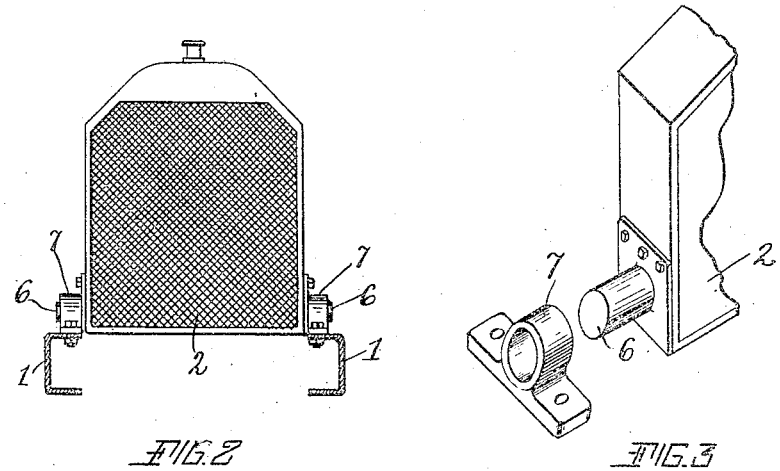

UNITED STATES PATENT OFFICE.

GIOVANNI ENRICO, OF TURIN, ITALY, ASSIGNOR, BY MESNE ASSIGNMENTS, TO F. I. A. T., OF POUGHKEEPSIE TOWNSHIP, NEW YORK, A CORPORATION OF NEW YORK.

RADIATOR SUSPENSION FOR MOTOR-CARS.

939,961.  Specification of Letters Patent.  Patented Nov. 9, 1909.

Application filed December 10, 1906. Serial No. 347,045.

*To all whom it may concern:*

Be it known that I, GIOVANNI ENRICO, subject of the King of Italy, residing at Turin, in the Province of Piedmont, Italy, have invented certain new and useful Improvements in Radiator Suspensions for Motor-Cars, of which the following is a full, clear, and exact specification.

This invention relates to motor-cars, and has particular reference to the means for supporting the radiators used on such cars.

Heretofore it has been customary to rigidly support the radiator upon the frame of the car, and when so supported the radiator is subjected to strains due to the flexion of the frame or to the strain between the engine and the frame. This strain upon the radiator tends to start the seams of the same and cause leakage. Moreover, the repair of the radiator is a matter of considerable difficulty and cost.

In carrying out my invention, I propose to flexibly mount the radiator with respect to the frame, engine, or such parts as it may be connected with.

In the accompanying drawings, I have illustrated a car, embodying one form of my invention.

Figure 1 represents a side view, with parts broken away, showing one form which my invention may take in practice. Fig. 2 is a front view of the same; and Fig. 3 a detail perspective view of one corner of the radiator and its supports.

In the drawings, 1, 1, represent the side parts of the chassis, and 2 represents the radiator, which may be of any suitable form or type.

3 represents the engine, which, in this case, is a four-cylinder vertical engine, but may be of any desired type.

4 is the usual pipe to the cooling water jackets of the engine, and 5 is the usual rubber section between the radiator and the pipe 4.

On each side of the radiator is fixed a trunnion adapted to fit into a bearing 7, which bearing is supported upon the side-frame 1.

It will be seen that the radiator would be free to tilt back and forth in the bearings 7 but for the support of the pipe 4.

In order to attain greater flexibility, a universal joint may be used in lieu of the trunnion and bearings here shown. A rod 8 from the dash-board or other convenient part to the central upper part of the radiator may be depended on for the support thereof, instead of depending upon the pipe 4. Any other suitable form of flexible connection may also be employed.

It will be seen that in starting and stopping the machine and in going up and down hill and over rough roads, the only strain placed upon the radiator will be the strain caused by its own weight, and not of other portions of the vehicle, as has been customary heretofore.

It will, of course, be understood that the invention may be modified in various respects without departing from the spirit thereof, and I therefore desire it to be understood that I do not limit myself to the specific construction shown in the drawings.

Having thus described my invention, I claim:

1. The combination with a chassis comprising separated side parts, of a radiator having trunnions at opposite sides, bearings for said trunnions carried by said side frames, and a support connecting the body of the radiator and the chassis, substantially as described.

2. The combination with a chassis, of a radiator supported thereby, trunnion supports for the radiator permitting swinging movement on a horizontal axis, one member of said trunnion supports being mounted on the side of the radiator and the other on the chassis, and means for supporting the top of the radiator.

In testimony whereof I affix my signature, in presence of two witnesses.

GIOVANNI ENRICO.

Witnesses:
C. HAUSMAN,
JOSEPH FORNOS.